(12) United States Patent
Diaz

(10) Patent No.: US 6,727,419 B1
(45) Date of Patent: Apr. 27, 2004

(54) PULSATING METRONOME

(76) Inventor: Manuel Diaz, 1136 Dinglewood Dr., Columbus, GA (US) 31906

( * ) Notice: Subject to any disclaimer, the term of this patent is extended or adjusted under 35 U.S.C. 154(b) by 0 days.

(21) Appl. No.: 10/308,614

(22) Filed: Dec. 3, 2002

(51) Int. Cl.[7] ............................................. G09B 15/00
(52) U.S. Cl. ..................... 84/484; 368/327; 368/278
(58) Field of Search ..................... 84/484; 368/327, 368/272, 278

(56) References Cited

U.S. PATENT DOCUMENTS 5,023,853 A * 6/1991 Kawata et al. .............. 368/230
D449,236 S * 10/2001 Hopkins ..................... D10/43

OTHER PUBLICATIONS

Southwest Strings; Catalog © 2002, pp. 73–76; Website: www.swstrings.com.

* cited by examiner

*Primary Examiner*—Kimberly Lockett
(74) *Attorney, Agent, or Firm*—Kilpatrick Stockton LLP

(57) ABSTRACT

A pulsating metronome includes a case and a band for attaching the case to the wrist of a wearer. A vibration means is mounted to the case at a location such that, when the device is worn on the wrist of the wearer, the vibration means is imposed against the wearer's wrist. A means is included for exciting the vibration means at predetermined intervals to impart vibrations against the wrist of the wearer so as to convey tempo information to the wearer.

9 Claims, 3 Drawing Sheets

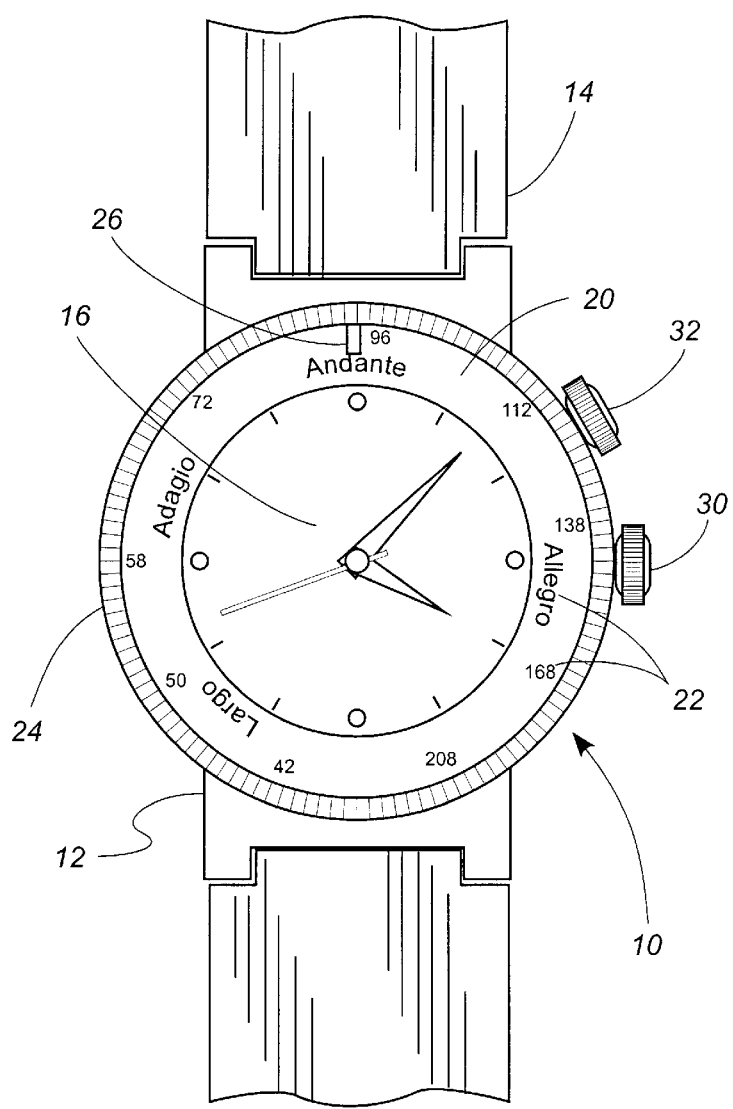
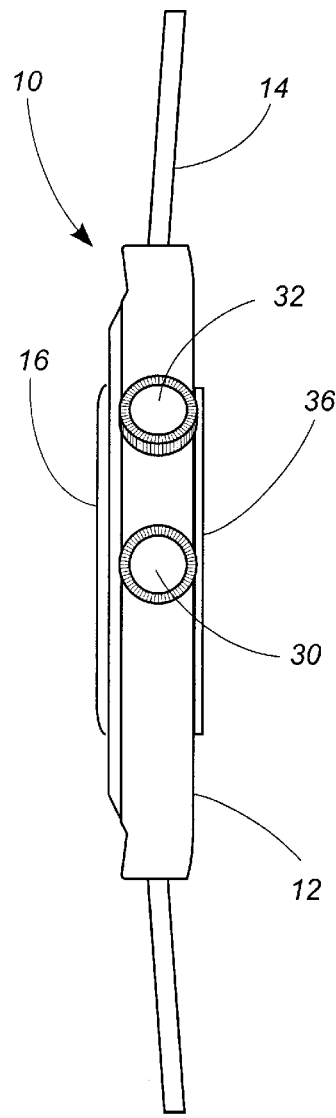
FIG. 1   FIG. 2

PULSATING METRONOME

TECHNICAL FIELD

The present invention relates generally to metronomes and relates more specifically to a metronome that employs a tactile pulse or vibration in place of an audible signal.

BACKGROUND OF THE INVENTION

A metronome is an instrument, typically used by musicians, that is designed to mark exact time by a regularly repeated signal. Traditional mechanical metronomes are based upon the movement of a pendulum and make an audible "tick" sound at regularly spaced intervals. The musician can move a weight up or down on the pendulum to adjust the duration of the interval to correspond to the musical composition being performed.

More recently, electronic metronomes have been developed that keep time electronically and signal tempo by either an audible sound or a flashing light.

Whether mechanical or electronic, previously known metronomes suffer certain disadvantages. Because the musician must be able to adjust the tempo of the metronome and turn it on and off, the device must be placed within arm's reach of the musician. In the case of metronomes that indicate tempo by a flashing light, the device must be positioned within the musician's field of view. And whether the signal is emitted audibly or visually, conventional metronomes can be a distraction to others.

Other metronome-like devices are used for exercise and recreational purposes. Runners and walkers use watches that emit an audible "beep" at regularly spaced intervals to help the exerciser maintain a steady pace. Because the watch is located on the lower arm, remote from the ear, and because the arm is constantly swinging back and forth, the sound emitted by the watch can sometimes be difficult to hear, unless the volume is turned up to a level that becomes a distraction to others.

SUMMARY OF THE INVENTION

Stated generally, the present invention comprises a metronome that keeps time by a tactile vibration, rather than an audible or visible signal. The metronome is incorporated into a watch and imparts the tactile vibration to the wearer's wrist.

Stated more specifically, the present device includes a case and a band for attaching the case to the wrist of a wearer. A vibration means is mounted to that case at a location such that, when the device is worn on the wrist of the wearer, the vibration means is imposed against the wearer's wrist. A means is included for exciting the vibration means at predetermined intervals to impart vibrations against the wrist of the wearer so as to convey tempo information to the wearer.

In a preferred embodiment the device includes a conventional watch, either analog or digital, mounted in the same case so that the metronome appears to be an ordinary watch. Also in the preferred embodiment, the vibration means is a plate attached to the back of the case.

Thus it is an object of the present invention to provide an improved metronome.

Other objects, features, and advantages of the present invention will become apparent upon reading the following specification, when taken in conjunction with the drawings and the appended claims.

BRIEF DESCRIPTION OF THE DRAWINGS

FIG. 1 is a front view of a watch with integral metronome.

FIG. 2 is a side view of the watch with integral metronome of FIG. 1

DETAILED DESCRIPTION OF THE DISCLOSED EMBODIMENT

Figure 3:
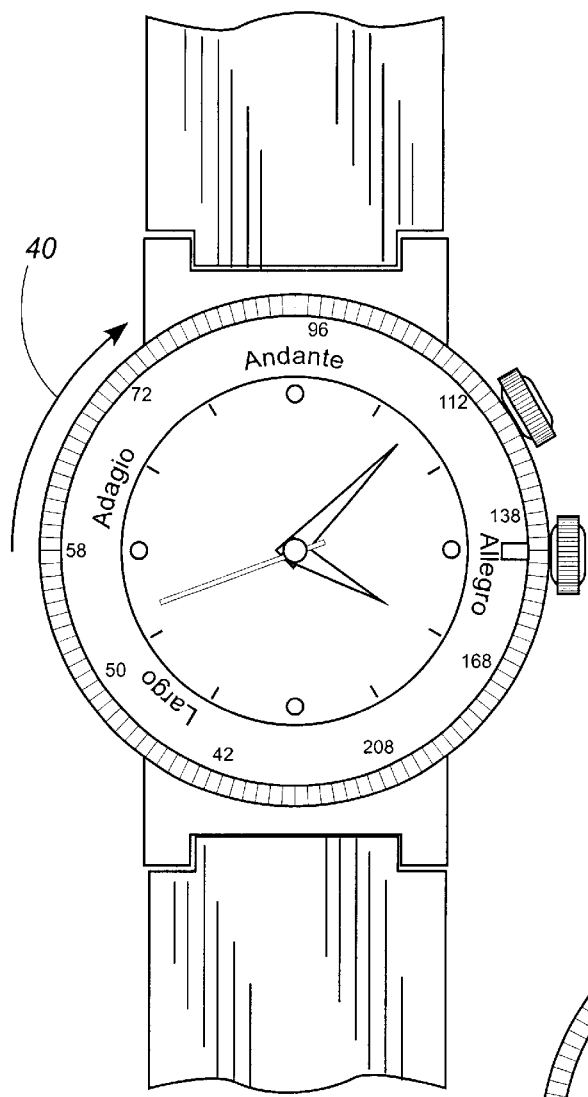
FIG. 3 is a front view of the watch of FIG. 1 with the metronome tempo control said in a different positioned than is shown in FIG. 1.
Figure 4:
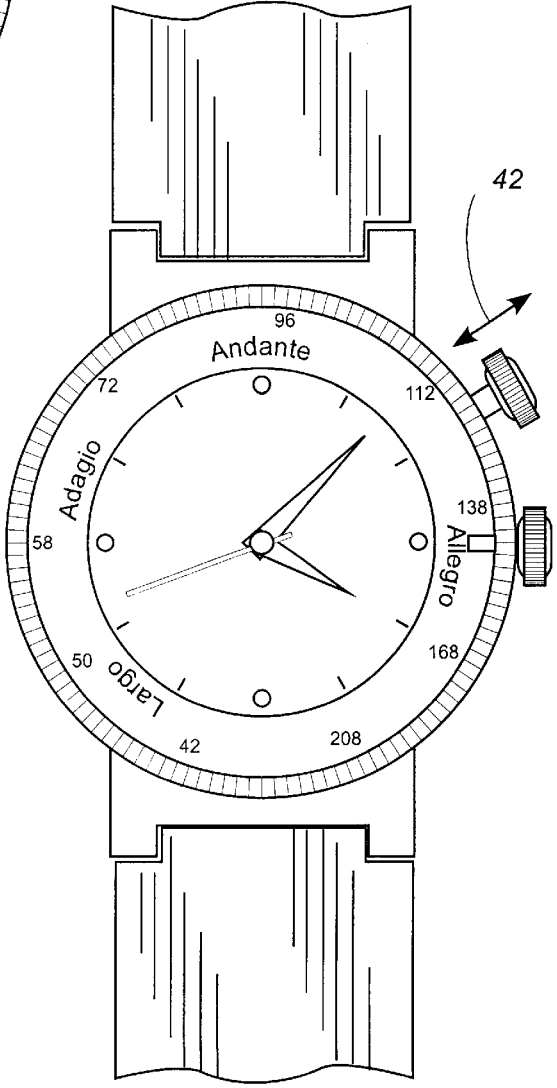
FIG. 4 is a front view of the watch of FIG. 3 with the metronome activated.

Referring now to the drawings, in which like numerals indicate like elements throughout the several views, FIGS. 1 and 2 depict a watch 10 with an integral electronic metronome. The watch 10 includes a case 12 and a band 14. A watch face 16 is located in the center of the case 12 and displays the time in either analog format (as illustrated) or digitally.

Surrounding the watch face is an annular disk 20 bearing indicia 22. The indicia 22 include numbers, words, or both corresponding to various musical tempos. In the example 10 the words "largo" (very slow), "adagio" (slow), "andante" (moderately slow), and "allegro" (lively) appear around the disk 20. In addition, numbers corresponding to beats per second and correlated to the words are spaced around the disk.

A metronome tempo control ring 24 is rotatably mounted around the disk 20. The control ring 24 of the disclosed embodiment has a coin-edge finish, to facilitate gripping the ring, as well as to aesthetically enhance the device. A pointer 26 is mounted to and rotates with the ring 24. The pointer 26 points to the words and numbers representing a tempo.

The watch 10 has two stems 30, 32. The first stem 30 is located at the three o'clock position and serves the conventional function of setting the watch to the correct time when the stem is pulled out and rotated. Depending upon the particular watch movement, the stem may also set a calendar date or wind a spring-operated watch movement depending upon whether and how far the stem is pulled out.

The second stem 32 is located at the two o'clock position on the watch and is operable to activate or to deactivate the metronome feature in response to the stem 32 being pulled out or pushed in.

Referring now to FIG. 2, on the back of the watch case is a plate 36. The plate 36 is disposed so as to be against the wrist of the wearer when the watch 10 is worn. The plate 36 is selectively operative to vibrate in response to a signal from an excitation means. Such vibrating elements and electronic circuitry for their excitation are well-known and are found in such devices as pagers and cellular phones.

Operation of the metronome feature will now be described. In FIG. 1, the pointer 26 is located at the 12 o'clock position, indicating a tempo of about 94 beats per minute. In FIG. 3, the metronome control ring 24 is rotated in a clockwise direction, as indicated by the arrow 40, until the pointer is aligned with an Allegro tempo of about 144 beats per minute. The wearer then pulls out the stem 32 as indicated by the arrow 42 to activate the metronome. The plate 36 begins to vibrate against the wrist of the wearer at a frequency of 144 events per minute. The wearer feels the plate 36 vibrating against his or her wrist at regular timed intervals and thus senses the tempo.

It will be appreciated that a musician can wear the watch 10 and maintain the preselected tempo without the need for audible tones or flashing lights, which can serve as a distraction to others.

Alternate embodiments of a watch 10 with an integral electronic metronome are possible. For example, rather than pulling out and pushing in a stem to activate and to deactivate the excitation means, the watch can have a toggle button that turns the device on in response to a first depression and toggles the device off in response to a second depression.

Figure 5:
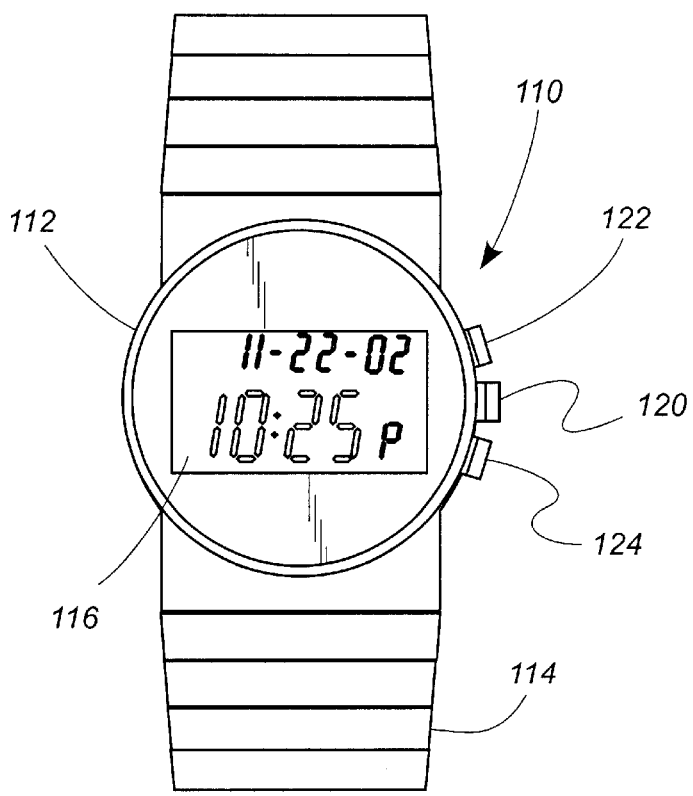
FIG. 5 is a front view of an alternate embodiment of a watch with an integral metronome, with a digital readout displaying the time and date.
Figure 6:
FIG. 6 is a front view of the watch of FIG. 5 with the digital display reflecting a tempo.

Similarly, alternate designs are possible for controlling the interval between vibrations. Rather than a rotatable ring, a digital readout can be employed, with appropriate buttons for increasing and decreasing the tempo in much the same way that the time on a digital watch is advanced or turned back to set the watch. Referring now to FIGS. 5 and 6, a digital watch 110 with integral metronome has a case 112 and a band 114. A digital readout 116 is located on the front face of the case 112. Three buttons 120, 122, and 124 are located on the right side of the case. The center button 120 is the "mode" button, the top button 122 is the "increment" button, and the bottom button 124 is the "decrement" button. Pressing the mode button 120 cycles through the "set clock" mode, the "clock" mode, the "set metronome" mode," and the "metronome" mode. FIG. 5 shows the digital display 116 in "clock" mode. When the watch is in "clock" mode, the increment and decrement buttons 122, 124 are nonfunctional. FIG. 6 shows the digital display in "metronome" mode, and the increment and decrement buttons 122, 124 are again in nonfunctional mode. "Set clock" mode and "set metronome" mode have similar readouts to "clock" and "metronome" modes, respectively, except that the numbers flash to indicate they are in the "set" mode. In the "set" modes, pressing the increment button 122 advances the clock or metronome, as appropriate, and pressing the decrement button 124 sets back the clock or metronome.

If desired, the digital display can also contain an alphanumeric readout for displaying the day/date in clock mode, and for indicating "andante," "adagio," etc. in metronome mode.

Finally, it will be understood that the watch, while useful, is not essential to the operation of the metronome and can be deleted, if desired, to minimize expense and the size of the device.

A similar device can be adapted for use by athletes to maintain a predetermined pace while working out. In such an embodiment, the Italian words for musical tempos can be replaced by words such as "slow," "moderate," "fast," and the like, or the words can be eliminated altogether. Similarly, the numbers on the range would correspond to a range of paces of use to athletes. Thus a runner, for example, might set the metronome feature for 150 beats per minute. In an athletic application, it might prove useful to employ a digital counter that keeps count of the beats.

Use of the watch by athletes provides the same advantages previously described with respect to a metronome for musical applications. The athlete, for example, does not have to rely on audible or visual cues to maintain a steady pace but instead senses the vibration of the plate against the back out of the wrist.

Finally, it will be understood that the preferred embodiment has been disclosed by way of example, and that other modifications may occur to those skilled in the art without departing from the scope and spirit of the appended claims.

What is claimed is:

1. A metronome for conveying tempo information by tactile means, comprising:

a case;

a band for attaching said case to the wrist of a wearer;

vibration means mounted to said case at a location that is imposed against said wrist of said wearer when said case is attached to said wrist of said wearer; and excitation means for exciting said vibration means at predetermined intervals to impart vibrations against said wrist of said wearer so as to convey tempo information to said wearer.

2. The metronome of claim 1, further comprising control means operatively associated with said excitation means for controlling the duration of said predetermined intervals.

3. The metronome of claim 1, further comprising means operatively associated with said excitation means for activating and deactivating said exciting means.

4. The metronome of claim 3, wherein said means for activating and deactivating said excitation means comprises a stem, and wherein pulling out said stem activates said exciting means.

5. The metronome of claim 1, further comprising a watch mounted within said case.

6. The metronome of claim 1, wherein said casing comprises a front and a back, and wherein said vibration means comprises a plate mounted to said back of said casing.

7. The metronome of claim 2, wherein said means for controlling the duration of said predetermined intervals comprises a rotatable ring mounted to said casing.

8. The metronome of claim 7, wherein said rotatable ring comprises a pointer, wherein said device further comprises indicia on said case adjacent said ring corresponding to various tempos, and wherein rotating said rotatable ring to a predetermined angular orientation sets the duration of said intervals to a tempo corresponding to indicia to which said pointer points.

9. The metronome of claim 7, wherein said watch comprises a watch face, and wherein said rotatable ring surrounds said watch face.

* * * * *